United States Patent
Wang et al.

(10) Patent No.: US 12,038,839 B2
(45) Date of Patent: Jul. 16, 2024

(54) PROCESSOR AND METHOD FOR DESIGNATING A DEMOTION TARGET TO BE DEMOTED FROM AN IN-CORE CACHE STRUCTURE TO AN OUT-OF-CORE CACHE STRUCTURE

(71) Applicant: Shanghai Zhaoxin Semiconductor Co., Ltd., Shanghai (CN)

(72) Inventors: Weilin Wang, Beijing (CN); Yingbing Guan, Shanghai (CN); Yue Qin, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 18/314,199

(22) Filed: May 9, 2023

(65) Prior Publication Data

US 2023/0418749 A1 Dec. 28, 2023

(30) Foreign Application Priority Data

Jun. 23, 2022 (CN) .......................... 202210718321.X

(51) Int. Cl.
*G06F 12/0811* (2016.01)
*G06F 12/084* (2016.01)
*G06F 12/0891* (2016.01)

(52) U.S. Cl.
CPC ........ *G06F 12/0811* (2013.01); *G06F 12/084* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 8,099,557 B2 * | 1/2012 | McCalpin | G06F 12/0833 |
| | | | 711/E12.039 |
| 10,564,972 B1 * | 2/2020 | Doshi | G06F 9/30145 |
| 2014/0129773 A1 * | 5/2014 | Habermann | G06F 12/0824 |
| | | | 711/122 |
| 2018/0121353 A1 * | 5/2018 | Gaur | G06F 12/0831 |
| 2018/0285105 A1 * | 10/2018 | Wang | G06F 12/0811 |
| 2019/0042419 A1 * | 2/2019 | Tamir | H04L 49/10 |
| 2019/0102303 A1 * | 4/2019 | Wang | G06F 12/0862 |
| 2021/0073129 A1 * | 3/2021 | Shah | G06F 12/126 |
| 2022/0100511 A1 * | 3/2022 | Heirman | G06F 12/12 |

* cited by examiner

*Primary Examiner* — Kaushikkumar M Patel
(74) *Attorney, Agent, or Firm* — McClure, Qualey & Rodack, LLP

(57) ABSTRACT

A processor and a method for designating a demotion target to demote the demotion target from an in-core cache structure to an out-of-core cache structure is shown. In response to a cache data demotion instruction supported by an instruction set architecture, a first core of a processor operates a decoder to decode the cache data demotion instruction into microinstructions. According to the microinstructions, a demotion target designation request is transferred to a last-level cache (LLC) through a memory order buffer to drive the LLC to query an out-of-core cache table. According to the demotion target's cache status in the first core obtained from the out-of-core cache table, the LLC outputs a snoop request to the first core to snoop on the demotion target and demote the demotion target from the in-core cache structure of the first core to the LLC.

26 Claims, 6 Drawing Sheets

PROCESSOR AND METHOD FOR DESIGNATING A DEMOTION TARGET TO BE DEMOTED FROM AN IN-CORE CACHE STRUCTURE TO AN OUT-OF-CORE CACHE STRUCTURE

CROSS REFERENCE TO RELATED APPLICATIONS

This Application claims priority of China Patent Application No. 202210718321.X, filed on Jun. 23, 2022, the entirety of which is incorporated by reference herein.

BACKGROUND

Technical Field

The present application relates to the management of a hierarchical cache system.

Description of the Related Art

Memory devices in a computer system are configured to form a hierarchical architecture. The upper-tier memory devices have the higher speed, lower latency, but smaller capacity. The memory hierarchy of most computer systems has the following four tiers (from the upper tier to the lower tier): registers; caches; a system memory (a main memory, such as a DRAM); and disks (SSD or HD).

Caches in particular may be further classified hierarchically. Ranked by access speed (fastest to slowest), a hierarchical cache system includes: a first-level cache (L1), a second-level cache (L2), and a third-level cache (L3, also named the last-level cache, or LLC for short). The management of such a hierarchical cache system has a significant impact on system performance.

How to effectively manage the hierarchical cache system is an important issue in processor design.

BRIEF SUMMARY

The present application proposes a management technology for the hierarchical cache system, which designates a demotion target to demote the demotion target from an in-core cache structure to an out-of-core cache structure.

A processor in accordance with an exemplary embodiment of the present application includes a first core, a last-level cache, and an out-of-core cache table. The first core includes a microcode storage device, a decoder, a memory order buffer, and an in-core cache structure. The last-level cache is coupled to the first core, and is shared by the first core and the other cores of the processor. For each of the different memory addresses, the out-of-core cache table shows its cache status in the last-level cache and its cache status in the each of the different cores of the processor. In response to a cache data demotion instruction that is supported by an instruction set architecture (ISA) and that is provided to demote the demotion target from the in-core cache structure to the out-of-core cache structure, the decoder outputs microinstructions based on the microcode stored in a memory storage device. According to the microinstructions, a demotion target designation request is transferred to the last-level cache through the memory order buffer to drive the last-level cache to query the out-of-core cache table. According to the demotion target's cache status in the first core obtained from the out-of-core cache table, the last-level cache outputs a snoop request to the first core to snoop on the demotion target and demote the demotion target from the in-core cache structure of the first core to the last-level cache.

In an exemplary embodiment, cache-status options to be recorded in the out-of-core cache table include a modified status, an exclusive status, a multi-core shared status, and an invalid status. In an exemplary embodiment, prior to being demoted from the in-core cache structure to the last-level cache, the demotion target in the first core is in the modified status or the exclusive status. After the demotion target is demoted from the in-core cache structure to the last-level cache, the out-of-core cache table is modified to show that in the last-level cache the demotion target is in the modified status or the exclusive status to comply with its cache status in the first core.

In an exemplary embodiment, the in-core cache structure of the first core includes a plurality of in-core caches. The first core includes an in-core cache table, wherein for each of the different memory addresses, the in-core cache table shows its cache status in the each of the different in-core caches of the first core. Cache-status options to be recorded in the in-core cache table include a modified status, an exclusive status, a multi-core shared status, and an invalid status.

In the example wherein prior to the demotion the demotion target in the first core is in the modified status or the exclusive status, the out-of-core cache table is modified after the demotion target is demoted from the in-core cache structure to the last-level cache. Thus, the modified out-of-core cache table shows that that in the first core the demotion target is changed to the multi-core shared status to retain the demotion target in the first core.

In an exemplary embodiment, prior to being demoted from the in-core cache structure to the last-level cache, the demotion target in the modified status or the exclusive status in the first core is cached in a source in-core cache. After the demotion target is demoted from the source in-core cache to the last-level cache, the in-core cache table is modified to show that in the source in-core cache the demotion target is changed to the multi-core shared status to retain the demotion target in the source in-core cache.

In an exemplary embodiment, the demotion target is a target cache line, and a memory address of the target cache line is entered as an operand of the cache data demotion instruction. Through the memory order buffer, the memory address is transformed to cache line information to be transferred to the last-level cache together with the demotion target designation request, to drive the last-level cache to query the out-of-core cache table to determine whether the target cache line is cached in the first core. When the target cache line is cached in the first core, the last-level cache sends the cache line information back to the first core together with the snoop request. In response to the snoop request, the first core queries the in-core cache table according to the cache line information carried by the snoop request, to recognize the source in-core cache with the target cache line cached therein, and the cache line information is transferred to the source in-core cache together with a demotion request. In response to the demotion request, the source in-core cache outputs cache data of the target cache line according to the cache line information carried by the demotion request, to be demoted from the source-in-core cache to the last-level cache, and the in-core cache table and the out-of-core cache table are modified according to the demotion of the target cache line.

In the exemplary embodiment wherein prior to the demotion the demotion target in the first core is in the modified status or the exclusive status, the out-of-core cache table is modified after the demotion target is demoted from the in-core cache structure to the last-level cache. Thus, in the first core the demotion target is changed to the invalid status, without retaining the demotion target in the first core. In an exemplary embodiment, prior to being demoted from the in-core cache structure to the last-level cache, the demotion target in the modified status or the exclusive status in the first core is cached in a source in-core cache. After the demotion target is demoted from the source in-core cache to the last-level cache, the in-core cache table is modified to show that in the source in-core cache the demotion target is changed to the invalid status, without retaining the demotion target in the source in-core cache.

In an exemplary embodiment, the demotion target is the whole source in-core cache. Through the memory order buffer, the demotion target designation request is transferred to the last-level cache to drive the last-level cache to query the out-of-core cache table to obtain target cache lines related to the first core. Cache line information of each target cache line is transferred to the first core together with a snoop request to query the in-core cache table to determine whether a snooped target cache line is cached in the source in-core cache. For each snooped target cache line cached in the source in-core cache, the cache line information is transferred to the source in-core cache together with a demotion request. In response to each demotion request, the source in-core cache outputs cache data of the target cache line according to the cache line information carried by the demotion request, to be demoted from the source-in-core cache to the last-level cache, and the in-core cache table and the out-of-core cache table are modified according to the demotion of the target cache line.

In an exemplary embodiment, the source in-core cache is a first-level cache (L1) within the first core.

In an exemplary embodiment, the cache data demotion instruction is a serializing instruction.

A detailed description is given in the following embodiments with reference to the accompanying drawings.

BRIEF DESCRIPTION OF THE DRAWINGS

The present application may be more fully understood by reading the subsequent detailed description and examples with references made to the accompanying drawings, wherein.

DETAILED DESCRIPTION

The following description is made for the purpose of illustrating the general principles of the application and should not be taken in a limiting sense. The scope of the application is best determined by reference to the appended claims.

This application introduces the management skills of a hierarchical cache system.

In a multi-core processor, some data may be quickly accessed from just one single core (available in just one single core). The data cached in just one single core may be in an exclusive status ("E" status) in the single core. In another situation, data cached in an in-core cache of a core may be the latest version just modified, and such data is in a modified status ("M" status) in the core. If the cache data available in just one single core (in the "E" status or in the "M" status) is called by the other cores, there will be a delay problem. For example, if core A requests to read cache data that is only available in core B, the cache data needs to be loaded from core B into the last-level cache (LLC, shared by core A and core B) to be read by core A. The cache data moving from the in-core cache structure to the last-level cache (LLC) is time-consuming. This application proposes a software and hardware interface. Without any call from the other cores, the cache data available in just one single core is automatically released to the last-level cache (LLC). In this manner, the read of the cache data no longer involve the cache data moving from the in-core cache structure to the last-level cache (LLC) and is responded in time.

The demotion target to be moved from the in-core cache structure to the out-of-core cache structure may be implemented in various scales. In addition to designating a cache line as a demotion target, the demotion target may be a designated in-core cache. In an example, the whole first-level instruction cache L1I is designated as the demotion target to be demoted to the last-level cache (LLC). In an exemplary, the whole first-level data cache L1D is designated as the demotion target to be demoted to the last-level cache (LLC). In an example, the whole first-level cache L1 (including L1I and L1D) is designated as the demotion target to be demoted to the last-level cache (LLC). In an example, the whole second-level cache L2 is designated as the demotion target to be demoted to the last-level cache (LLC). In an example, the whole in-core cache structure (L1 and L2) is designated as the demotion target to be demoted to the last-level cache (LLC).

Figure 1:
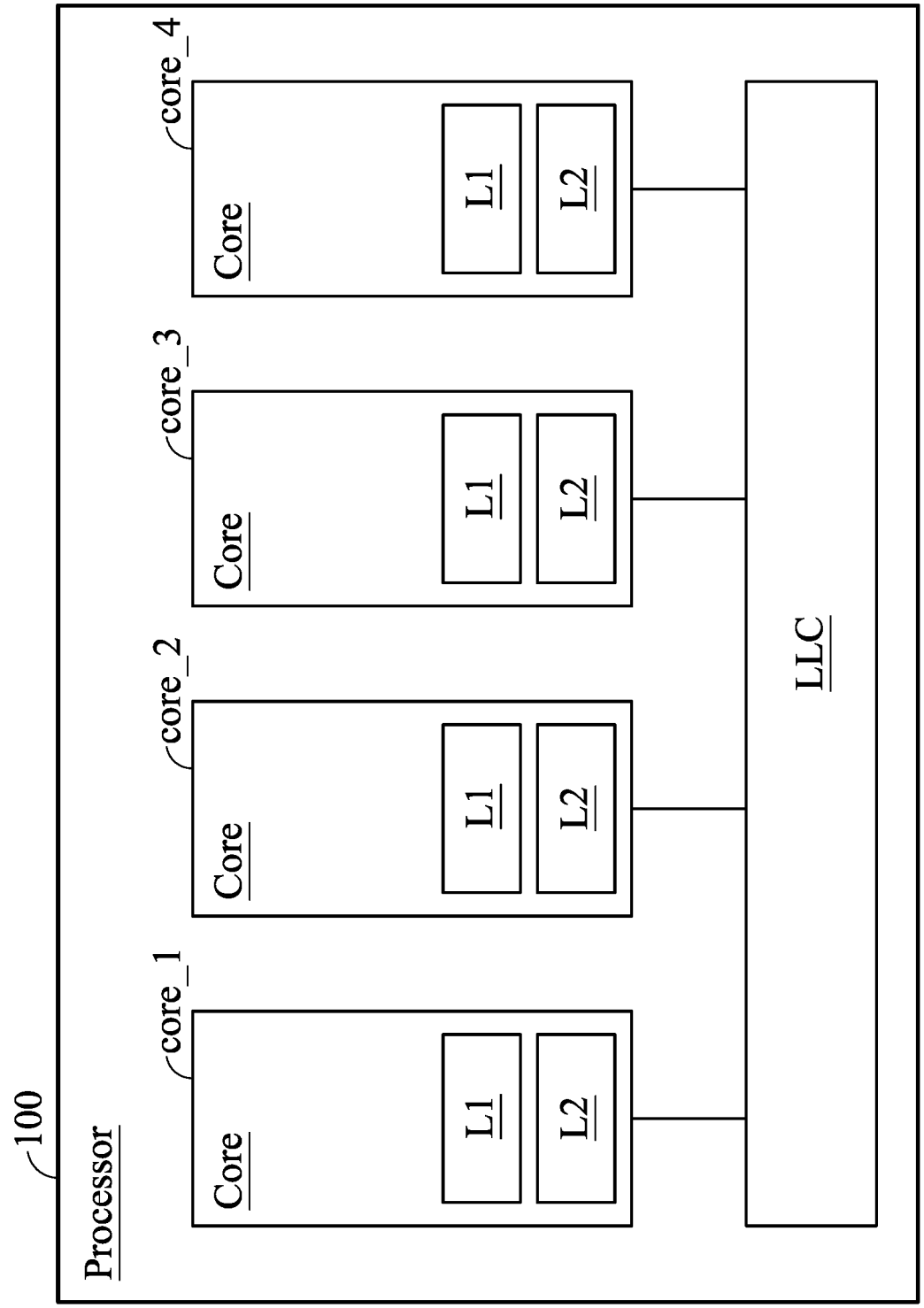
FIG. 1 illustrates a multi-core processor 100 in accordance with an exemplary embodiment of the present application, which includes four cores: core_1, core_2, core_3 and core_4.

FIG. 1 illustrates a multi-core processor 100 in accordance with an exemplary embodiment of the present application, which includes four cores: core_1, core_2, core_3 and core_4. Each core includes a first-level cache L1 (including L1I and L1D) and a second-level cache L2. The last-level cache LLC (the third-level cache L3) is shared by core_1, core_2, core_3, and core_4 of the processor 100. The in-core cache structure (L1 and L2) of the each core and the last-level cache LLC shared by the different cores form a hierarchical cache system (Cache_sys hereinafter). The processor 100 introduces a cache data demotion instruction that is supported by an instruction set architecture (Instruction Set Architecture, ISA for short), and may introduce modifications on the hardware. By executing the cache data demotion instruction, a core actively (not responding to the other cores) demote the designated cache data from its in-core cache structure to the last-level cache LLC outside the core. The designated cache data to be demoted (the demotion target) may be one cache line, or a first-level instruction cache L1I, or a first-level data cache L1D, or the whole first-level cache L1 (including L1I and L1D), or a second-level cache L2, or the whole in-core cache structure (including L1 and L2). The Instruction Set Architecture (ISA) supported by the processor 100 is not limited, and may be an x86 architecture, an Advanced RISC Machine (abbreviated ARM) architecture, or others.

Figure 2:
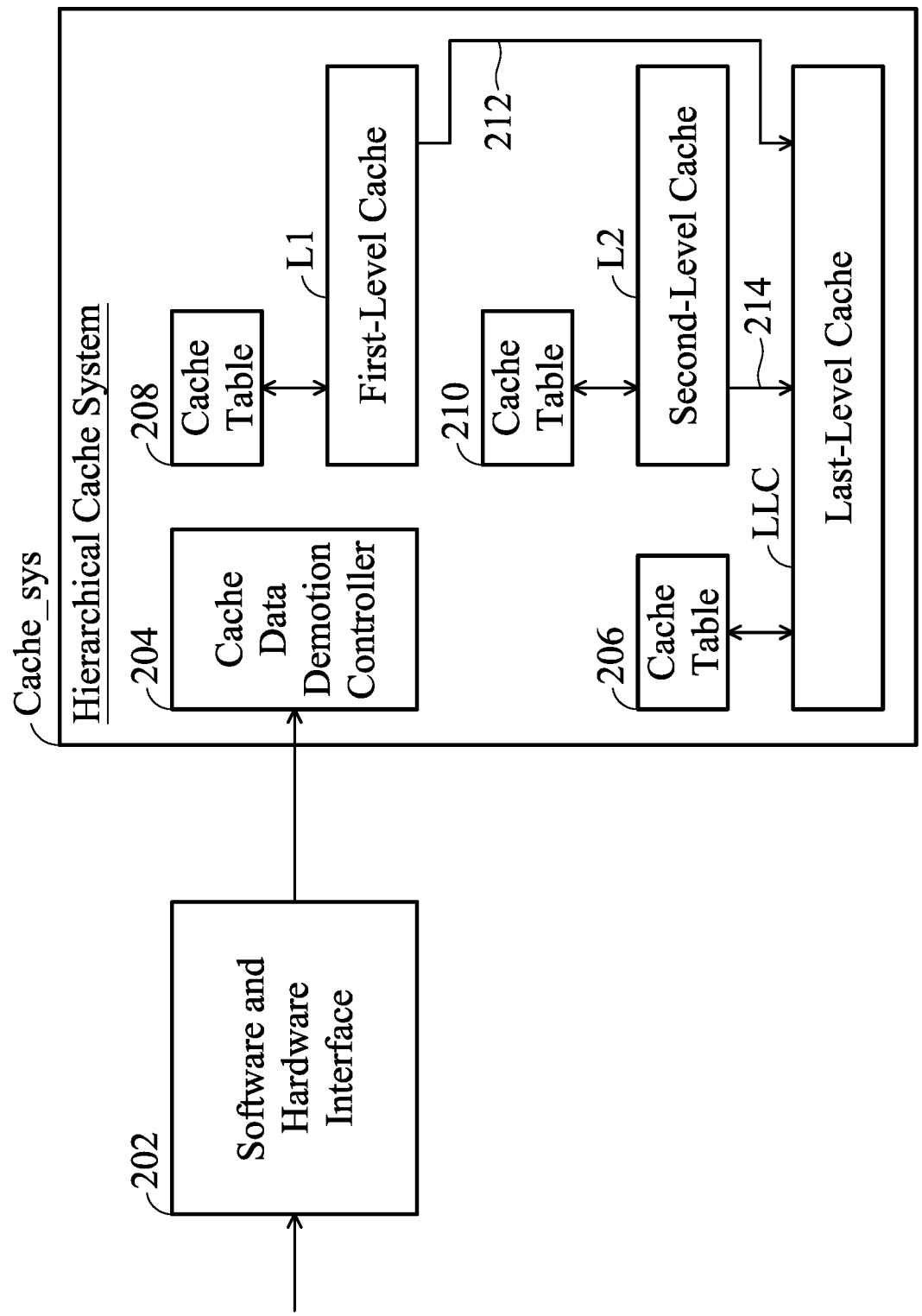
FIG. 2 is a block diagram illustrating a software and hardware interface 202 in accordance with an exemplary embodiment of the present application.

FIG. 2 is a block diagram illustrating a software and hardware interface 202 in accordance with an exemplary embodiment of the present application. The simplified illustration shows only the in-core caches L1 and L2 of a single core. In addition to the multi-level caches L1, L2 and LLC, the hierarchical cache system Cache_sys further includes a cache data demotion controller 204, and several cache tables 206, 208 and 210 are updated for management of the hierarchical cache system Cache_sys.

With respect to the different memory addresses (each representing one cache line), the cache table 206 shows their cache statuses in the last-level cache LLC/L3 and their cache statuses in the different cores core_1 to core_4. "M" represents the modified status, "I" represents the invalid status, "E" represents the exclusive status, and "S" represents the multi-core shared status.

For each cache line represented by one memory address, its cache statuses in the different in-core caches of each core (e.g., L1 and L2 are the different in-core caches in each core) may be recorded separately. For example, in each core, the first-level cache L1 has a corresponding cache table 208, and the second-level cache L2 has a corresponding cache table 210.

Through the software and hardware interface 202, the processor hardware operates according to the processor software to drive the hierarchical cache system Cache_sys to demote a demotion target from an in-core cache structure of the current core to an out-of-core cache structure. The cache data demotion instruction is used in the software coding. The cache data demotion instruction requests for a demotion operation of cache data and issues the demotion size. After recognizing the demotion operation and the demotion size, the hardware generates hardware recognizable signals, to drive the demotion controller 204 to search the in-core caches L1 and L2 (for example, by querying the cache table 206, and then to snoop on more information by querying the cache tables 208 and 210) to find the demotion target, and issues a demotion request to the source in-core cache(s) with the demotion target cached therein. In response to the demotion request, the first-level cache L1 outputs the cache data of the demotion target to the last-level cache LLC (referring to the arrow 212). In this example, the second-level cache L2 also outputs the cache data of the demotion target to the last-level cache LLC (referring to the arrow 214). The cache tables 206, 208, and 210 are updated according to the demotion operation.

The demotion operation may be implemented by two ways. The cache data of the demotion target may be retained in the source in-core cache. Or, the cache data of the demotion target may be removed from the source in-core cache.

Figure 3A:
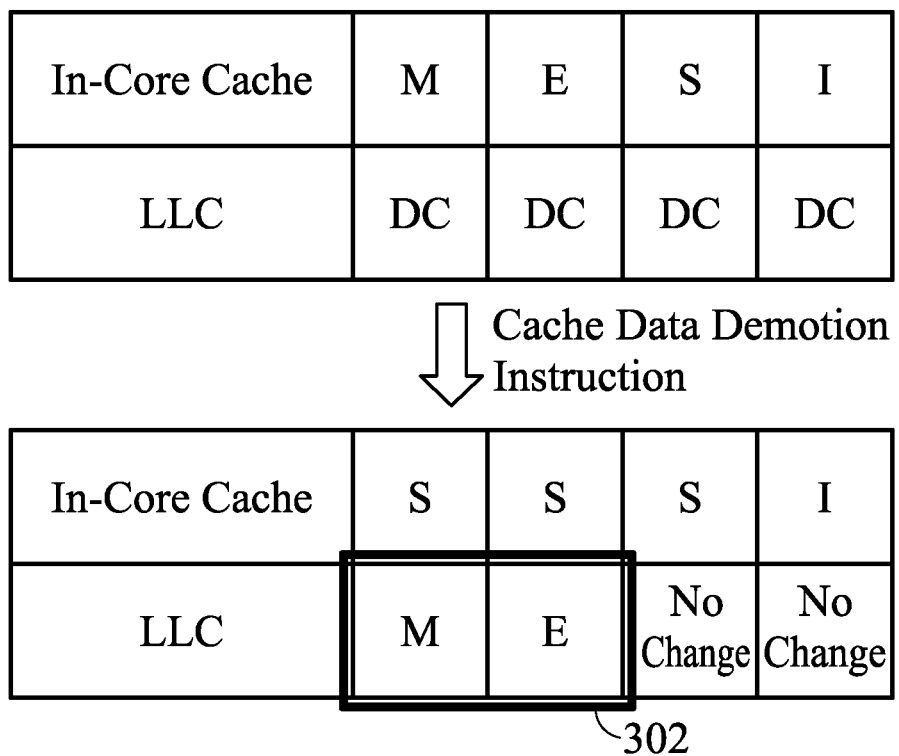
FIG. 3A illustrates how the cache table is updated when the cache data of the demotion target is retained in the source in-core cache.

FIG. 3A illustrates how the cache table is updated when the cache data of the demotion target is retained in the source in-core cache. The source in-core cache may be the first-level instruction cache L1I, the first-level data cache L1D, the first-level cache L1, or the second-level cache L2, or the entire in-core cache structure (including L1 and L2 both, and the cache status records of L1 and L2 may be combined in the same table). In addition to the aforementioned M, E, S, I statuses, there is a DC (don't care) status, which may be any status. Because the demotion of cache data (demoted from the in-core cache structure to the out-of-core cache structure) does not remove the cache data of the demotion target from the source in-core cache, the table of FIG. 3A shows that the demotion target's M/E status (prior to the demotion) in the in-core cache structure is changed to the S status (indicating that the cache data has been shared out to LLC). In addition, as indicated by the frame line 302, the demotion target demoted to the last-level cache LLC is in the M/E status, to comply with its previous M/E status in the source in-core cache.

Figure 3B:
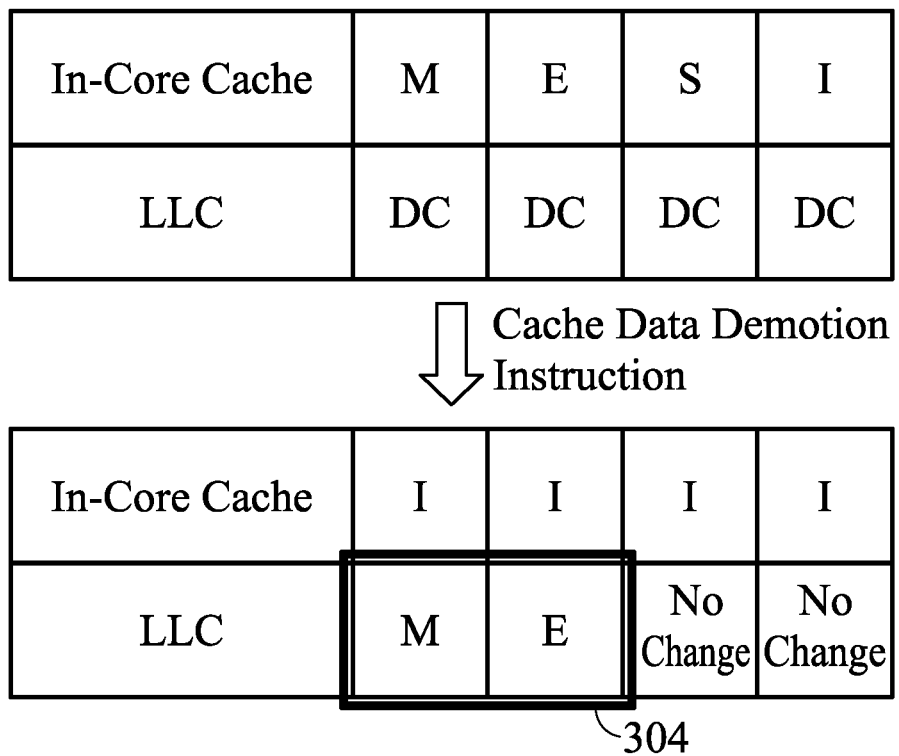
FIG. 3B illustrates how the cache table is updated when the cache data of the demotion target is not retained in the source in-core cache.

FIG. 3B illustrates how the cache table is updated when the cache data of the demotion target is not retained in the source in-core cache. Because the demotion of cache data (demoted from the in-core cache structure to the out-of-core cache structure) removes the cache data of the demotion target from the source in-core cache, the table of FIG. 3B shows that the demotion target's M/E status (prior to the demotion) in the in-core cache structure is changed to the I status (indicating that the cache data is invalid). In addition, as indicated by the frame line 304, in the last-level cache LLC, the demotion target demoted to the last-level cache LLC is in the M/E status, to comply with its M/E status in the source in-core cache.

In an exemplary embodiment, the proposed processor introduces a cache data demotion instruction _CLMOVE that is an ISA instruction. An operand of the cache data demotion instruction _CLMOVE is set to designate one target cache line as a demotion target. In an exemplary embodiment, a memory address m8 is entered as the operand to designate the target cache line. If the target cache line is indeed cached within the core which is executing the cache data demotion instruction _CLMOVE, the demotion starts. In an exemplary embodiment, the demotion is limited to the cache lines in the M/E status. It means that only the designated cache line is in the M/E status in the current core, the demotion is allowed. In particular, the demotion that is performed in response to the cache data demotion instruction _CLMOVE does not remove the cache data of the demotion target from the source in-core cache. The cache table update is based on that shown in FIG. 3A.

In an exemplary embodiment, the proposed processor introduces a cache data demotion instruction L1D_DEMOTE that is an ISA instruction. The cache data demotion instruction L1D_DEMOTE is designed to demote the cache data of the first-level data cache L1D of the current core (executing the cache data demotion instruction L1D_DEMOTE) to the lower-level cache. In an exemplary embodiment, no matter is the M/E status or not, the cache data of the first-level data cache L1D is completely demoted to the last-level cache LLC. In particular, the demotion that is performed in response to the cache data demotion instruction _CLMOVE does not retain the cache data of the demotion target in the source in-core cache (L1D). The cache table update is based on that shown in FIG. 3B.

In some exemplary embodiments, microcode (ucode) of the processor may have modifications corresponding to these instructions (e.g., _CLMOVE, L1D_DEMOTE, or others), and modifications may be also found in the processor hardware.

Figure 4:
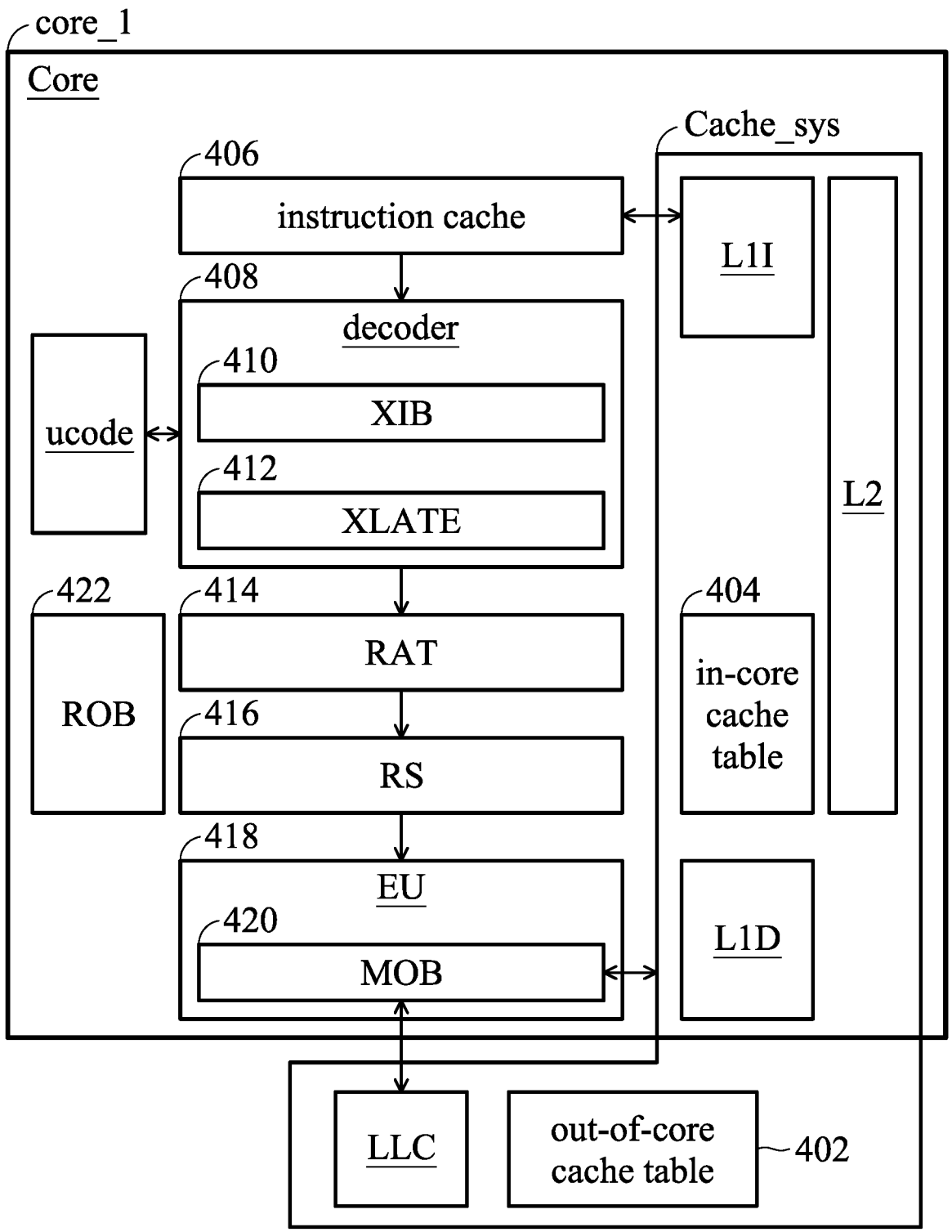
FIG. 4 is a block diagram illustrating a processor and a core core_1 thereon in accordance with an exemplary embodiment of the present application.

FIG. 4 is a block diagram illustrating a processor and a core core_1 thereon in accordance with an exemplary embodiment of the present application. The illustrated hierarchical cache system Cache_sys includes a first-level instruction cache L1I, a first-level data cache L1D, a second-level cache L2, and a last-level cache (LLC) L3. The first-level instruction cache L1I and the first-level data cache L1D form a first-level cache L1. The first-level cache L1 and the second-level cache L2 are in-core caches of the core core_1. In a multi-core processor, the last-level cache (LLC) L3 is shared by multiple cores (as shown in FIG. 1). The hierarchical cache system Cache_sys further includes in-core caches of the other cores (e.g., the first-level caches L1 and the second-level caches L2 of the other cores core_2-core_4). The illustrated hierarchical cache system Cache_sys further includes an out-of-core cache table 402 and an in-core cache table 404. Cache lines are represented by memory addresses. For each memory address, the out-of-core cache table 402 (referring to the cache table 206) lists its cache status in the last-level cache LLC and its cache statuses in the different cores core_1-core_4, and the in-core cache table 404 (referring to the cache tables 208 and 210) lists its cache statuses in the first-level instruction cache L1I, the first-level data cache L1D, and the second-level cache L2 of core core_1.

A section of instructions is first read from the system memory or the first-level instruction cache L1I and then loaded into an instruction cache 406 to be further sent to a decoder 408 for decoding. The decoder 408 includes an instruction buffer (XIB for short) 410 and an instruction translator (XLATE for short) 412. From the instruction buffer (XIB) 410, the instructions proposed in the present application (e.g., CLMOVE, or L1D_DEMOTE) are recognized. Based on the microcode (ucode, stored in the microcode storage device), the instruction translator (XLATE) 412 translates the recognized instructions (e.g., CLMOVE, or L1D_DEMOTE) into to microinstructions to operate the pipelined hardware. Through a register alias table (RAT for short) 414, the source and destination (src/dst) of each microinstruction is renamed. The reservation station (RS for short) 416 determines whether to execute the microinstructions and, accordingly, sends microinstructions to an execution unit (EU) 418 to drive the memory order buffer (MOB) 420. The memory order buffer (MOB) 420 operates according to the microinstructions decoded from the instructions (e.g., CLMOVE, or L1D_DEMOTE), to demote the demotion target (e.g., a target cache line, or the whole L1D) from the in-core cache structure to the out-of-core cache structure. The microinstructions that have been executed (out of order) will wait in a re-order buffer (ROB for short) 422 to be retired (in order).

Based on the forgoing hardware actions, the microinstructions decoded from the cache data demotion instructions CLMOVE or L1D_DEMOTE drive the hierarchical cache system Cache_sys through the memory order buffer (MOB) 420.

Figure 5:
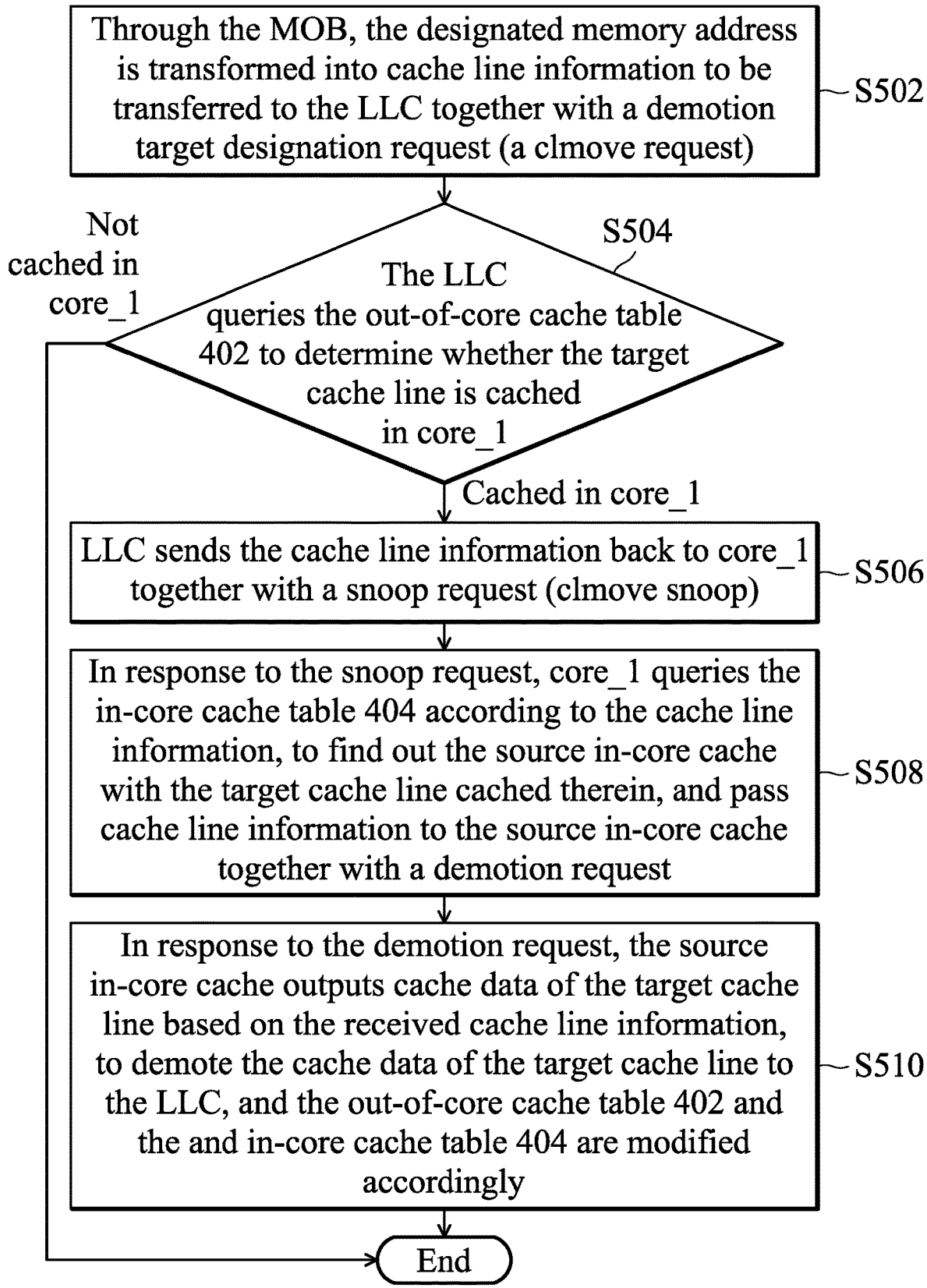
FIG. 5 is a flowchart illustrating how the microinstructions decoded from the cache data demotion instruction _CLMOVE drive the hierarchical cache system Cache_sys through the memory order buffer (MOB) 420 in accordance with an exemplary embodiment of the present application.

FIG. 5 is a flowchart illustrating how the microinstructions decoded from the cache data demotion instruction _CLMOVE drive the hierarchical cache system Cache_sys through the memory order buffer (MOB) 420 in accordance with an exemplary embodiment of the present application. In step S502, through the memory order buffer (MOB) 420, the memory address m8 (of a target cache line) designated through the cache data demotion instruction _CLMOVE is transformed into cache line information (e.g., a physical address PA), and the cache line information is transferred to the last-level cache LLC together with a demotion target designation request (a request named clmove). In step S504, the last-level cache LLC queries the out-of-core cache table 402 to determine whether the target cache line designated through the cache data demotion instruction _CLMOVE is cached in the core core_1. If not, the procedure ends, and the related microinstructions waiting to be retired. If yes, the flow goes to step S506, and the last-level cache LLC sends the cache line information back to the core core_1 together with a snoop request (clmove snoop). In step S508, in response to the snoop request (clmove snoop), the core core_1 queries the in-core cache table 404 according to the cache line information, to find out the source in-core cache with the target cache line cached therein (for example, determining whether the target cache line is cached in the first-level cache L1 or the second-level cache L2). The cache line information is passed to the source in-core cache together with a demotion request. In step S510, in response to the demotion request, the source in-core cache outputs cache data of the target cache line based on the received cache line information, to demote the cache data of the target cache line to the last-level cache LLC, and the out-of-core cache table 402 and the and in-core cache table 404 are modified accordingly. The table update should refer to FIG. 3A, wherein in response to the cache data demotion instruction _CLMOVE, the cache data of the demotion target is retained in the source in-core cache. Then, the flow ends, and the related microinstructions are retired (in order).

In particular, if it is determined in step S504 that the target cache line is not cached in the core core_1, the subsequent microinstructions related to the target cache line may be allowed to be executed right now, without being delayed by the demotion of the target cache line. On the contrary, the subsequent microinstructions related to the target cache line should be postponed until step S510 is finished.

Figure 6:
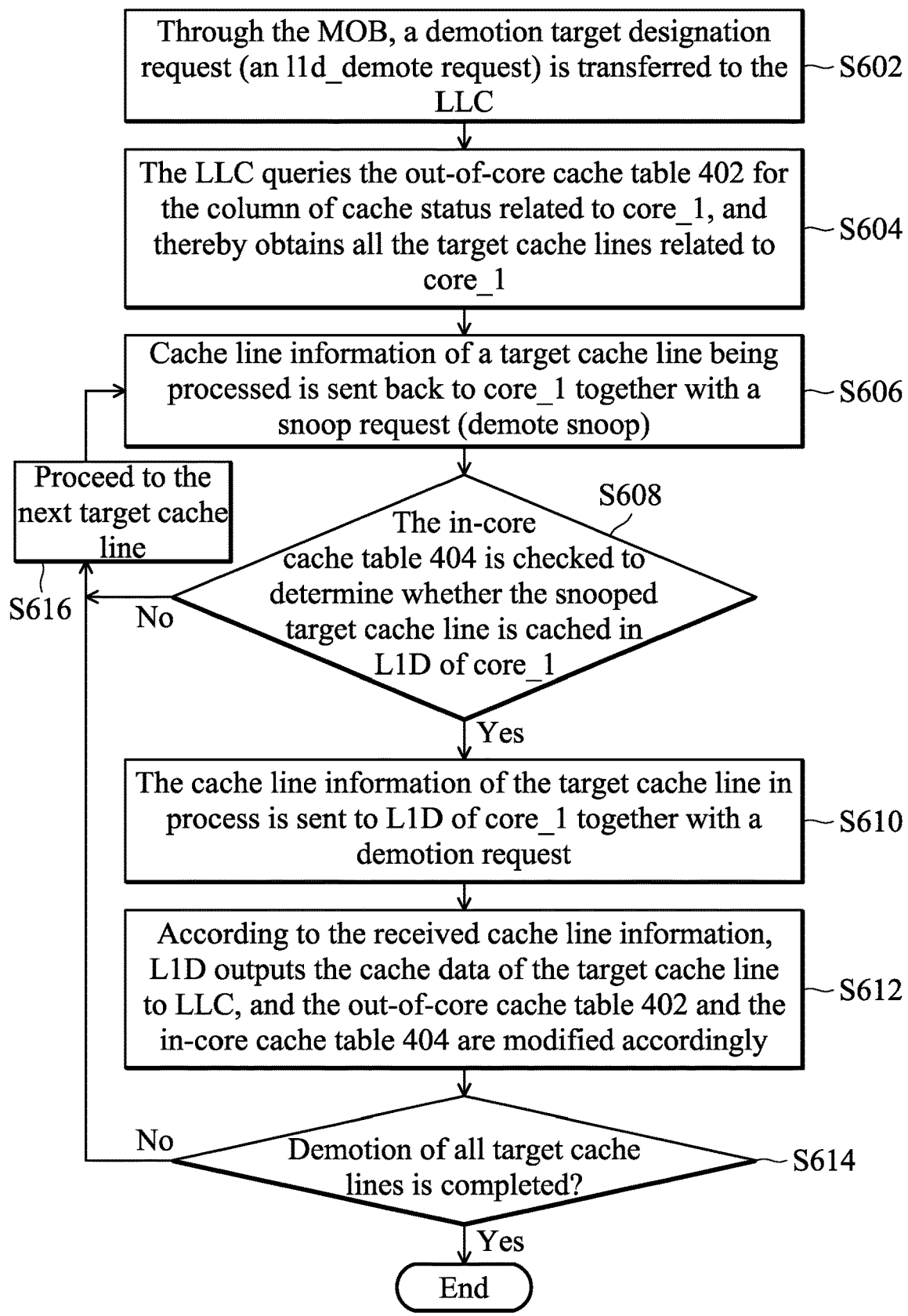
FIG. 6 is a flowchart illustrating how the microinstructions that the core core_1 translates from the cache data demotion instruction L1D_DEMOTE drive the hierarchical cache system Cache_sys through the memory order buffer (MOB) 420 in accordance with an exemplary embodiment of the present application.

FIG. 6 is a flowchart illustrating how the microinstructions that the core core_1 translates from the cache data demotion instruction L1D_DEMOTE drive the hierarchical cache system Cache_sys through the memory order buffer (MOB) 420 in accordance with an exemplary embodiment of the present application. In step S602, through the memory order buffer (MOB) 420, a demotion target designation request l1d_demote is transferred to the last-level cache LLC. In step S604, the last-level cache LLC queries the out-of-core cache table 402 for the column of cache status related to the current core core_1 (the core that initiates the cache data demotion instruction L1D_DEMOTE), and thereby obtains all the target cache lines related to the current core core_1. In step S606, cache line information (e.g., a physical address PA) of a target cache line being processed is sent back to the current core core_1 together with a snoop request (demote snoop). In step S608, the in-core cache table 404 is checked to determine whether the snooped target cache line is cached in the first-level data cache L1D of the core core_1. If yes, in step S610, the cache line information of the target cache line in process is sent to the first-level data cache L1D of the core core_1 together with a demotion request. In step S612, according to the received cache line information, the first-level data cache L1D outputs the cache data of the target cache line to the last-level cache LLC, and the out-of-core cache table 402 and the in-core cache table 404 are modified accordingly. The table update should refer to FIG. 3B, wherein in response to the cache data demotion instruction L1D_DEMOTE, the demotion target is not retained in the source in-core cache. In step S614, it is determined whether the demotion of all target cache lines is completed. If not, the flow proceeds to the next target cache line in step S616, and then step S606 is repeated. The last-level cache LLC output the next snoop request to the core core_1 to snoop on the next target cache line. Note that in step S608, if the in-core cache table 404 shows that the snooped target cache line is not cached in the first-level data cache L1D, the procedure also proceeds to the next target cache line in step S616, and then step S606 is repeated. The last-level cache LLC output the next snoop request to the core core_1 to snoop on the next target cache line. When the demotion of all target cache lines is finished, the procedure ends. Then, the related microinstructions are retired (in order).

The cache data demotion instruction L1D_DEMOTE may involve the demotion of several target cache lines. In an exemplary embodiment, the cache data demotion instruction L1D_DEMOTE is a serializing instruction. The microinstructions of the cache data demotion instruction L1D_DEMOTE are suspended until the microinstructions of the instructions prior to the cache data demotion instruction L1D_DEMOTE are all retired. In addition, the instructions subsequent to the cache data demotion instruction L1D_DEMOTE are not executed until the microinstructions of the cache data demotion instruction L1D_DEMOTE are all executed.

In addition to designate the first-level data cache L1D to demote its cache data to the out-of-core cache structure (by executing the cache data demotion instruction L1D_DEMOTE), there are other instructions to designate the other in-core caches to demote their cache data to the out-of-core cache structure. For example, the cache data demotion instruction L1D_DEMOTE may be modified to designate the first-level instruction cache L1I, or the second-level cache L2, or the first-level cache (including L1I and L1D), or the in-core cache structure (including L1 and L2) as the demotion target to demote its cache data to the out-of-core cache structure.

In software programming, such a cache data demotion instruction may be coded after any single-core cached event (which results in having data cached in just one single core) to release the cache data from the single core.

Any multi-core processor using an ISA instruction, accompanying with hardware and microcode design, to designate a demotion target (simply designating one cache line, or designating any in-core cache) to demote the demotion target from the in-core cache structure to the out-of-core cache structure is within the scope of the present application.

While the application has been described by way of example and in terms of the preferred embodiments, it should be understood that the application is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor, designating a demotion target to demote the demotion target from an in-core cache structure to an out-of-core cache structure, comprising:
a first core, including a decoder, a memory order buffer, and the in-core cache structure;
a last-level cache coupled to the first core; and
an out-of-core cache table;
wherein:
the last-level cache is shared by the first core and the other cores of the processor;
for each of the different memory addresses, the out-of-core cache table shows its cache status in the last-level cache and its cache status in each of the different cores of the processor;
in response to a cache data demotion instruction supported by an instruction set architecture, the decoder outputs microinstructions, wherein the cache data demotion instruction is executed to designate the demotion target and demote the demotion target from the in-core cache structure to the out-of-core cache structure;
according to the microinstructions, a demotion target designation request is transferred to the last-level cache through the memory order buffer to drive the last-level cache to query the out-of-core cache table;
according to the demotion target's cache status in the first core obtained from the out-of-core cache table, the last-level cache outputs a snoop request to the first core to snoop on the demotion target and demote the demotion target from the in-core cache structure of the first core to the last-level cache.

2. The processor as claimed in claim 1, wherein:
cache-status options to be recorded in the out-of-core cache table include a modified status, an exclusive status, a multi-core shared status, and an invalid status; and
prior to being demoted from the in-core cache structure to the last-level cache, the demotion target in the first core is in the modified status or the exclusive status; and
after the demotion target is demoted from the in-core cache structure to the last-level cache, the out-of-core cache table is modified to show that in the last-level cache the demotion target is in the modified status or the exclusive status to comply with its cache status in the first core.

3. The processor as claimed in claim 2, wherein:
the in-core cache structure of the first core includes a plurality of in-core caches;
the first core includes an in-core cache table, wherein for each of the different memory addresses, the in-core cache table shows its cache status in each of the different in-core caches of the first core; and
cache-status options to be recorded in the in-core cache table include a modified status, an exclusive status, a multi-core shared status, and an invalid status.

4. The processor as claimed in claim 3, wherein:
after the demotion target is demoted from the in-core cache structure to the last-level cache, the out-of-core cache table is modified to show that in the first core the demotion target is changed to the multi-core shared status to retain the demotion target in the first core.

5. The processor as claimed in claim 4, wherein:
prior to being demoted from the in-core cache structure to the last-level cache, the demotion target in the modified status or the exclusive status in the first core is cached in a source in-core cache; and
after the demotion target is demoted from the source in-core cache to the last-level cache, the in-core cache table is modified to show that in the source in-core cache the demotion target is changed to the multi-core shared status to retain the demotion target in the source in-core cache.

6. The processor as claimed in claim 5, wherein:
the demotion target is a target cache line, and a memory address of the target cache line is entered as an operand of the cache data demotion instruction.

7. The processor as claimed in claim 6, wherein:
through the memory order buffer, the memory address is transformed to cache line information to be transferred to the last-level cache together with the demotion target designation request, to drive the last-level cache to query the out-of-core cache table to determine whether the target cache line is cached in the first core;
when the target cache line is cached in the first core, the last-level cache sends the cache line information back to the first core together with the snoop request;
in response to the snoop request, the first core queries the in-core cache table according to the cache line information carried by the snoop request, to recognize the source in-core cache with the target cache line cached therein, and the cache line information is transferred to the source in-core cache together with a demotion request; and
in response to the demotion request, the source in-core cache outputs cache data of the target cache line according to the cache line information carried by the demotion request, to be demoted from the source-in-core cache to the last-level cache, and the in-core cache table and the out-of-core cache table are modified according to the demotion of the target cache line.

8. The processor as claimed in claim 3, wherein:
after the demotion target is demoted from the in-core cache structure to the last-level cache, the out-of-core cache table is modified to show that in the first core the demotion target is changed to the invalid status, without retaining the demotion target in the first core.

9. The processor as claimed in claim 8, wherein:
prior to being demoted from the in-core cache structure to the last-level cache, the demotion target in the modified status or the exclusive status in the first core is cached in a source in-core cache; and
after the demotion target is demoted from the source in-core cache to the last-level cache, the in-core cache table is modified to show that in the source in-core cache the demotion target is changed to the invalid status, without retaining the demotion target in the source in-core cache.

10. The processor as claimed in claim 9, wherein:
the demotion target is the whole source in-core cache;
through the memory order buffer, the demotion target designation request is transferred to the last-level cache to drive the last-level cache to query the out-of-core cache table to obtain target cache lines related to the first core;
cache line information of each target cache line is transferred to the first core together with a snoop request to query the in-core cache table to determine whether a snooped target cache line is cached in the source in-core cache;
for each snooped target cache line cached in the source in-core cache, the cache line information is transferred to the source in-core cache together with a demotion request; and
in response to each demotion request, the source in-core cache outputs cache data of the target cache line according to the cache line information carried by the demotion request, to be demoted from the source-in-core cache to the last-level cache, and the in-core cache table and the out-of-core cache table are modified according to the demotion of the target cache line.

11. The processor as claimed in claim 10, wherein:
the source in-core cache is a first-level cache within the first core.

12. The processor as claimed in claim 10, wherein:
the cache data demotion instruction is a serializing instruction.

13. The processor as claimed in claim 1, wherein:
the first core includes a microcode storage device;
in response to the cache data demotion instruction, the decoder decodes the instruction into the microinstructions based on a microcode stored in the microcode storage device.

14. A method for operating a processor to designate a demotion target to demote the demotion target from an in-core cache structure to an out-of-core cache structure, comprising:
providing a cache data demotion instruction to be executed by a first core of a processor, wherein the cache data demotion instruction is supported by an instruction set architecture, and is executed to designate the demotion target and demote the demotion target from the in-core cache structure to the out-of-core cache structure;
operating a decoder of the first core to decode the cache data demotion instruction into microinstructions based on a microcode stored in a microcode storage device;
according to the microinstructions, operating a memory order buffer of the first core to transfer a demotion target designation request to a last-level cache of the processor, to drive the last-level cache to query an out-of-core cache table, wherein for each of the different memory addresses, the out-of-core cache table shows its cache status in the last-level cache and its cache status in the first core and its cache status in each of the other cores of the processor;
according to the demotion target's cache status in the first core obtained from the out-of-core cache table, a snoop request is issued to the first core to snoop on the demotion target; and
when being snooped, the demotion target is demoted from the in-core cache structure to the last-level cache.

15. The method as claimed in claim 14, wherein:
cache-status options to be recorded in the out-of-core cache table include a modified status, an exclusive status, a multi-core shared status, and an invalid status; and
prior to being demoted from the in-core cache structure to the last-level cache, the demotion target in the first core is in the modified status or the exclusive status; and
after the demotion target is demoted from the in-core cache structure to the last-level cache, the out-of-core cache table is modified to show that in the last-level cache the demotion target is in the modified status or the exclusive status to comply with its cache status in the first core.

16. The method as claimed in claim 15, wherein:
the in-core cache structure of the first core includes a plurality of in-core caches;
the first core includes an in-core cache table, wherein for each of the different memory addresses, the in-core cache table shows its cache status in each of the different in-core caches of the first core; and
cache-status options to be recorded in the in-core cache table include a modified status, an exclusive status, a multi-core shared status, and an invalid status.

17. The method as claimed in claim 16, wherein:
after the demotion target is demoted from the in-core cache structure to the last-level cache, the out-of-core cache table is modified to show that in the first core the demotion target is changed to the multi-core shared status to retain the demotion target in the first core.

18. The method as claimed in claim 17, wherein:
prior to being demoted from the in-core cache structure to the last-level cache, the demotion target in the modified status or the exclusive status in the first core is cached in a source in-core cache; and
after the demotion target is demoted from the source in-core cache to the last-level cache, the in-core cache table is modified to show that in the source in-core cache the demotion target is changed to the multi-core shared status to retain the demotion target in the source in-core cache.

19. The method as claimed in claim 18, wherein:
the demotion target is a target cache line, and a memory address of the target cache line is entered as an operand of the cache data demotion instruction.

20. The method as claimed in claim 19, wherein:
through the memory order buffer, the memory address is transformed to cache line information to be transferred to the last-level cache together with the demotion target designation request, to drive the last-level cache to query the out-of-core cache table to determine whether the target cache line is cached in the first core;
when the target cache line is cached in the first core, the last-level cache sends the cache line information back to the first core together with the snoop request;
in response to the snoop request, the first core queries the in-core cache table according to the cache line information carried by the snoop request, to recognize the source in-core cache with the target cache line cached therein, and the cache line information is transferred to the source in-core cache together with a demotion request; and
in response to the demotion request, the source in-core cache outputs cache data of the target cache line according to the cache line information carried by the demotion request, to be demoted from the source-in-core cache to the last-level cache, and the in-core cache table and the out-of-core cache table are modified according to the demotion of the target cache line.

21. The method as claimed in claim 16, wherein:
after the demotion target is demoted from the in-core cache structure to the last-level cache, the out-of-core cache table is modified to show that in the first core the demotion target is changed to the invalid status, without retaining the demotion target in the first core.

22. The method as claimed in claim 21, wherein:
prior to being demoted from the in-core cache structure to the last-level cache, the demotion target in the modified status or the exclusive status in the first core is cached in a source in-core cache; and
after the demotion target is demoted from the source in-core cache to the last-level cache, the in-core cache table is modified to show that in the source in-core cache the demotion target is changed to the invalid status, without retaining the demotion target in the source in-core cache.

23. The method as claimed in claim 22, wherein:
the demotion target is the whole source in-core cache;
through the memory order buffer, the demotion target designation request is transferred to the last-level cache to drive the last-level cache to query the out-of-core cache table to obtain target cache lines related to the first core;
cache line information of each target cache line is transferred to the first core together with a snoop request to query the in-core cache table to determine whether a snooped target cache line is cached in the source in-core cache;
for each snooped target cache line cached in the source in-core cache, the cache line information is transferred to the source in-core cache together with a demotion request; and
in response to each demotion request, the source in-core cache outputs cache data of the target cache line according to the cache line information carried by the demotion request, to be demoted from the source-in-core cache to the last-level cache, and the in-core cache table and the out-of-core cache table are modified according to the demotion of the target cache line.

24. The method as claimed in claim 23, wherein:
the source in-core cache is a first-level cache within the first core.

25. The method as claimed in claim 23, wherein:
the cache data demotion instruction is a serializing instruction.

26. The method as claimed in claim 14, wherein:
the first core includes the microcode storage device;
in response to the cache data demotion instruction, the decoder decodes the instruction into the microinstructions based on a microcode stored in the microcode storage device.

* * * * *